(12) United States Patent
Keziah et al.

(10) Patent No.: US 10,358,059 B2
(45) Date of Patent: Jul. 23, 2019

(54) UTILITY VEHICLE

(71) Applicant: KUBOTA CORPORATION, Osaka (JP)

(72) Inventors: Scott Keziah, Buford, GA (US); Aubrey Jarvis, Atlanta, GA (US); David Spitz, Atlanta, GA (US)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 15/831,889

(22) Filed: Dec. 5, 2017

(65) Prior Publication Data
US 2019/0168658 A1    Jun. 6, 2019

(51) Int. Cl.
| | |
|---|---|
| *B60N 2/36* | (2006.01) |
| *B60P 3/42* | (2006.01) |
| *B60N 2/20* | (2006.01) |
| *B62D 33/02* | (2006.01) |

(52) U.S. Cl.
CPC ............. *B60N 2/36* (2013.01); *B60N 2/206* (2013.01); *B60P 3/423* (2013.01); *B60N 2002/363* (2013.01); *B62D 33/02* (2013.01)

(58) Field of Classification Search
CPC ............. B62D 33/0273; B62D 33/023; B62D 33/027; B62D 33/03; B60N 2/206; B60N 2/36; B60N 2/30; B60N 2/32; B60N 2/34; B60N 2/012
USPC .......................... 296/65.01, 66–69
See application file for complete search history.

(56) References Cited

U.S. PATENT DOCUMENTS

| | | |
|---|---|---|
| 8,075,040 B2 | 12/2011 | Arnold |
| 8,322,772 B1 | 12/2012 | Gilbeck et al. |

*Primary Examiner* — Dennis H Pedder
(74) *Attorney, Agent, or Firm* — Greenblum & Bernstein, P.L.C.

(57) ABSTRACT

A utility vehicle includes a cargo box and a seat device located on the front side of the cargo box. The seat device includes a seat bottom and a seat back that includes a first lateral swinging shaft that extends in a lateral direction, a seat back frame that swings about the first lateral swinging shaft between an upright position and a horizontal position at which the seat back frame overlaps with the seat bottom, and a seat back main body that is attached to the seat back frame. The seat back frame in the horizontal position defines an expansion floor by which the floor of the cargo box is expanded in a forward direction. The seat back main body swings to a hanging orientation with respect to the seat back frame in the horizontal position and is located in front of the seat bottom.

7 Claims, 12 Drawing Sheets

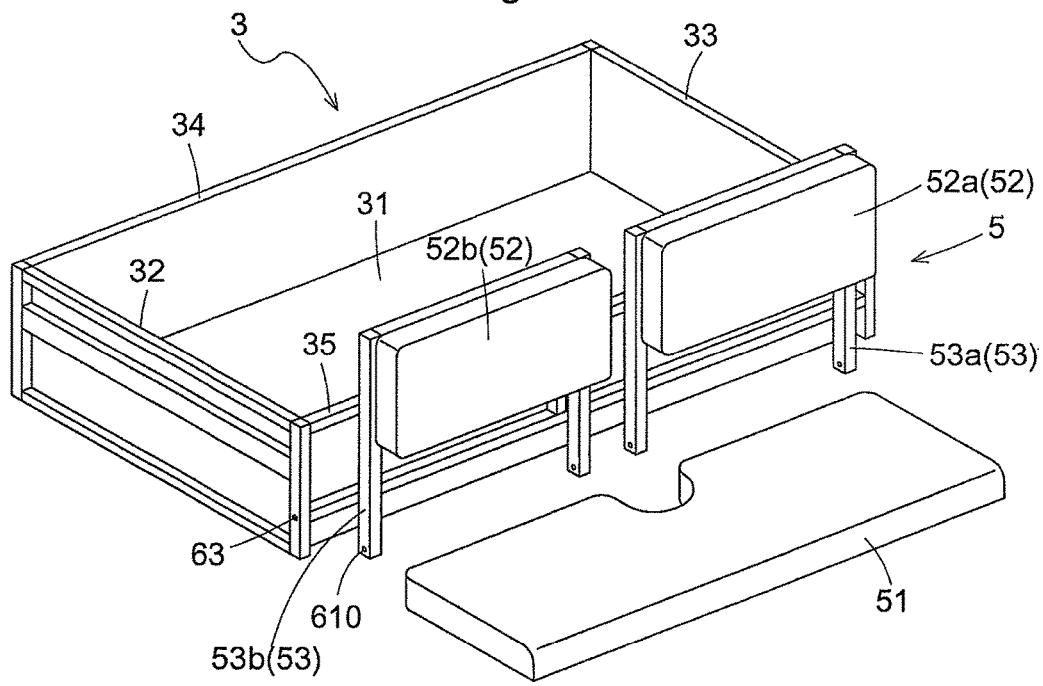
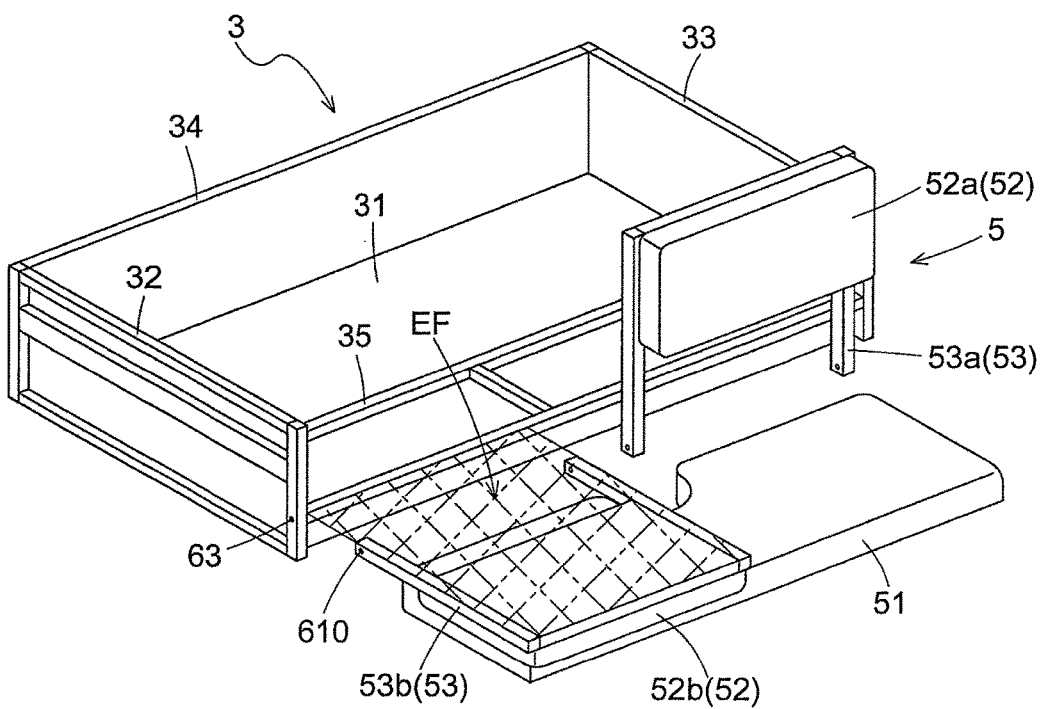

UTILITY VEHICLE

TECHNICAL FIELD

The present invention relates to a utility vehicle that includes a convertible cargo and is suitable for off-road or recreational use.

BACKGROUND ART

Many utility vehicles have a front-rear two-row seat configuration composed of a front seat and a back seat or a single-row seat configuration. Furthermore, a cargo bed (cargo) is provided rearward of the seats. With a convertible cargo, the space of the seats can be used as expansion space for the cargo. For example, with the utility vehicle disclosed in U.S. Pat. No. 8,322,772, a seat back included in a rear seat is attached so as to be able to swing between an upright position at which the rear surface thereof is an approximately vertical plane, and a lowered position at which the rear surface is an approximately horizontal plane. The front surface of the seat back in the lowered position overlaps with the seat bottom. If a heavy object is placed in the expansion area of the cargo floor created on the seat back that has been swung to the lowered position, there is a possibility that the seat back will strongly press against the seat bottom. Also, with this structure, the flatness of the floor of the expanded cargo is not necessarily ensured.

With the utility vehicle disclosed in U.S. Pat. No. 8,075,040, the seat back and seat bottom of the rear seat are separate and are constituted by separate members. The seat back is attached to the rear surface of the front floor, which can swing to a horizontal orientation and an upright orientation. The front floor in the horizontal orientation forms a portion of a bed floor of a utility bed (cargo) and the front floor in the upright orientation functions as a support frame for the seat back. The seat bottom is attached to the bottom surface of the front wall of the utility bed. The front wall can also swing to the upright orientation and the horizontal orientation, and the front floor in the horizontal orientation functions as a support frame for the seat bottom. With this rear seat structure, when the rear seat is folded to expand the space of the cargo, the seat backs are separate and do not overlap. However, the structure is complicated and the manufacturing cost is a problem. Furthermore, since a structure is used in which the seat backs are completely separate, it is difficult to correct the positional relationship between the seat backs. As a result, the seat comfort deteriorates.

SUMMARY OF THE INVENTION

An object of the present invention is to provide a utility vehicle with a cargo space that is expanded through a simple change of orientation of the seating.

A utility vehicle according to the present invention includes a vehicle frame, a cargo box supported by the vehicle frame on the vehicle rearward side, and a single-row seat device supported by the vehicle frame on the front side of the cargo box. The seat device includes a seat bottom supported by the vehicle frame and a seat back. The seat back has a first lateral swinging shaft that extends in the vehicle lateral direction and is supported by the vehicle frame, a seat back frame that swings about the first lateral swinging shaft between an upright position and a horizontal position at which the seat back frame overlaps with the seat bottom, and a seat back main body that is attached to the seat back frame so as to be able to swing about a second lateral swinging shaft that is parallel to the first lateral swinging shaft. At this time, the seat back frame in the upright position functions as a front wall of the cargo box, and the seat back frame in the horizontal position defines the expansion floor by which the floor of the cargo box is expanded in the forward direction. The seat back main body swings to a hanging orientation with respect to the seat back frame in the horizontal position and is located in front of the seat bottom.

With this configuration, a seat back unit composed of the seat back main body and the seat back frame is configured to be foldable, and by swinging the seat back unit forward until it reaches the horizontal orientation, an expansion floor by which the floor of the cargo box is expanded in the forward direction is created above the seat back frame. In other words, the upper side of the seat back frame can be used as an extension space of the cargo. Furthermore, by swinging the seat back main body about the second lateral swinging shaft so as to reach the hanging orientation with respect to the seat back frame, the seat back main body is located outside of the expansion floor.

In one preferred embodiment of the present invention, the first lateral swinging shaft is arranged at a position at which the upper surface of the seat back frame in the horizontal position matches the floor surface of the cargo box, between the lower end of the seat back frame and the vehicle frame. Accordingly, the cargo floor and the expansion floor create a flat surface and the utility of the cargo further increases.

In one preferred embodiment of the present invention, the second lateral swinging shaft is arranged between the upper end of the seat back frame and the upper end of the seat back main body. Accordingly, the entirety of the seat back main body hangs down from the seat back frame that is in the horizontal orientation, and the seat back main body is located below the expansion floor. Accordingly, the utility of the expansion floor further increases.

Another utility vehicle according to the present invention includes a vehicle frame, a cargo box that is supported by the vehicle frame on the vehicle rearward side and is composed of a front door, a rear door, a left door, a right door, and a cargo floor, and a rear seat device supported by the vehicle frame in front of the cargo box. The rear seat device has a seat bottom supported by the vehicle frame, a first swinging shaft that extends in the vehicle lateral direction and is supported by the vehicle frame, a seat back frame that swings about the first lateral swinging shaft between an upright position and a horizontal position at which the seat back frame overlaps with the seat bottom, and a seat back main body attached to the seat back frame. Furthermore, the front door that has been swung forward to the horizontal orientation and the seat back frame in the horizontal position define the expansion floor by which the cargo floor is expanded in the forward direction. At this time, the cargo floor, the front wall in the horizontal orientation, and the seat back frame in the horizontal position are aligned in the vehicle front-rear direction.

In this configuration as well, the seat back unit composed of the seat back main body and the seat back frame can be folded. Due to the front door of the cargo box being swung forward to the horizontal orientation and the seat back unit being swung forward to the horizontal orientation, the expansion floor by which the floor of the cargo box is expanded in the forward direction is created above the front door and the seat back frame. In other words, the cargo floor is extended to the front end of the seat back frame.

Furthermore, as a preferred embodiment of the present invention, the seat device is composed of a left seat unit and a right seat unit aligned in the vehicle lateral direction, and the seat units include the seat bottom, the seat back, and the first lateral swinging shaft. Accordingly, one or both of the left seat unit and the right seat unit are folded so as to create expansion floors of various sizes.

The utility vehicle according to the present invention includes a vehicle frame, a cargo box supported by the vehicle frame on a vehicle rearward side, and a seat device supported by the vehicle frame in front of the cargo box. The cargo box has a front door and a cargo floor, and the front door is swingable between an upright orientation and a horizontal orientation, and the front door in the horizontal orientation overlaps with an upper face of the cargo floor. A seat device includes: a seat bottom supported by the vehicle frame; and a seat back. The seat back includes: a first lateral swinging shaft that extends in a vehicle lateral direction and is supported by the vehicle frame; a seat back frame that is swingable about the first lateral swinging shaft between an upright position and a horizontal position; and a seat back main body that is attached to the seat back frame and overlaps with the seat bottom when the seat back is in the horizontal position. The seat back frame in the horizontal position defines an expansion floor by which the cargo floor is expanded in a forward direction. The seat back main body overlaps with the seat bottom by swinging the seat back frame to the horizontal position. Also with this configuration, by swinging the front door of the cargo box rearward and swinging the seat back frame forward, an expansion floor by which the cargo floor is expanded in the forward direction is created above the seat back frame. At that time, the seat back frame is supported by the seat bottom via the seat back main body.

BRIEF DESCRIPTION OF DRAWINGS

FIG. 16 is a perspective view showing a modified version of the rear seat device.

FIG. 17 is a schematic perspective view showing a cargo space that has been extended by folding the left seat back.

DETAILED DESCRIPTION

Hereinafter, one embodiment of the utility vehicle according to the present invention will be described with reference to the drawings. The utility vehicle includes a vehicle frame 11 that is supported by left and right pairs of front wheels 12 and rear wheels 13, and a cargo box 3 on the rear side of the vehicle frame 11. The cargo box 3 is convertible. In the present specification, unless otherwise indicated, "front" means frontward in the vehicle body front-rear direction (traveling direction), and "rear" means rearward in the vehicle body front-rear direction (traveling direction). Also, the left-right direction or lateral direction means the vehicle body lateral crossing direction (vehicle body width direction) that intersects with the vehicle body front-rear direction. "Up" and "down" are positional relationships in the vertical direction (perpendicular direction) of the vehicle body, and indicate positional relationships in the above-ground height.

Figure 1:
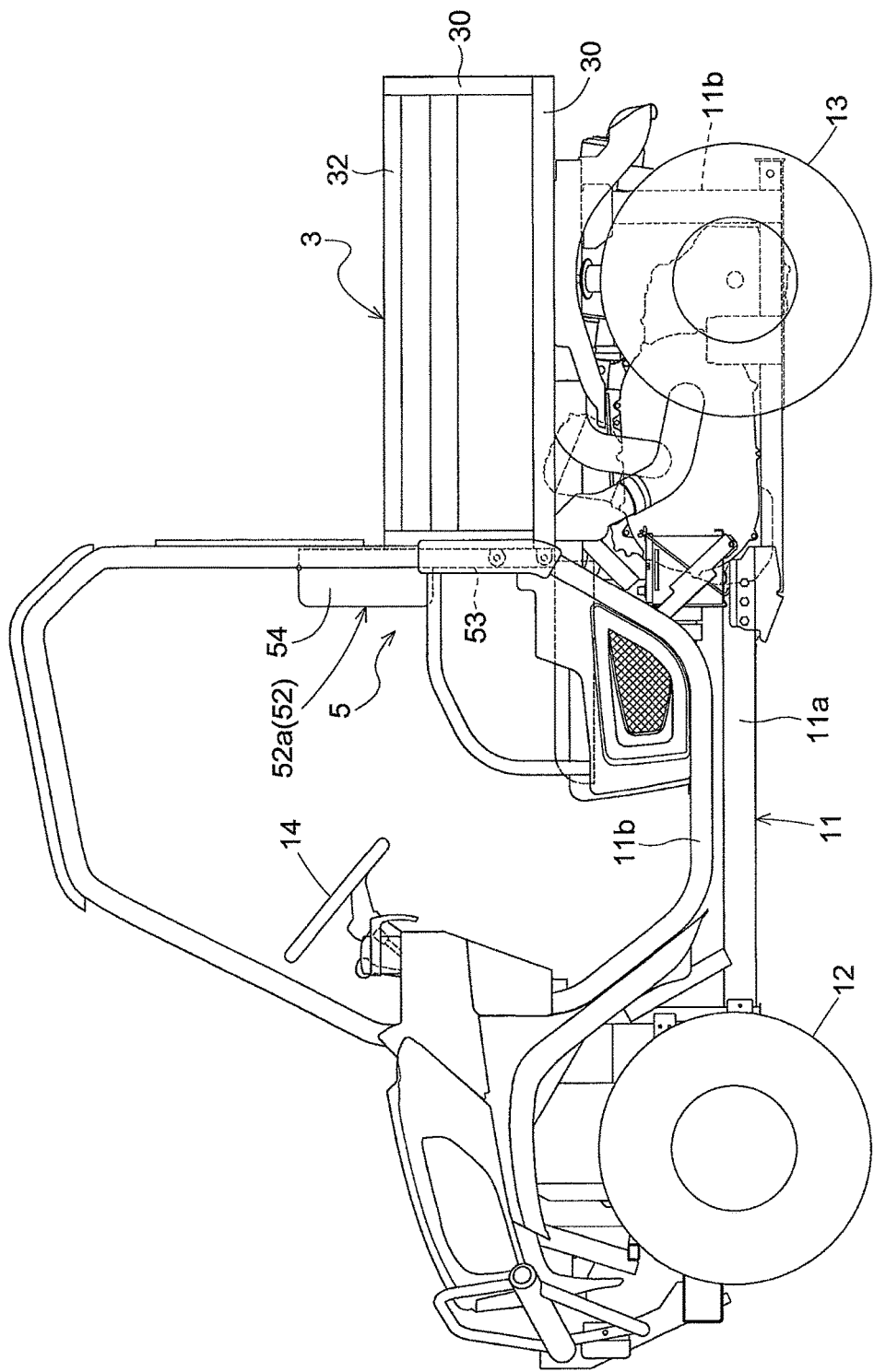
FIG. 1 shows a side view of a utility vehicle according to a first embodiment.
Figure 2:
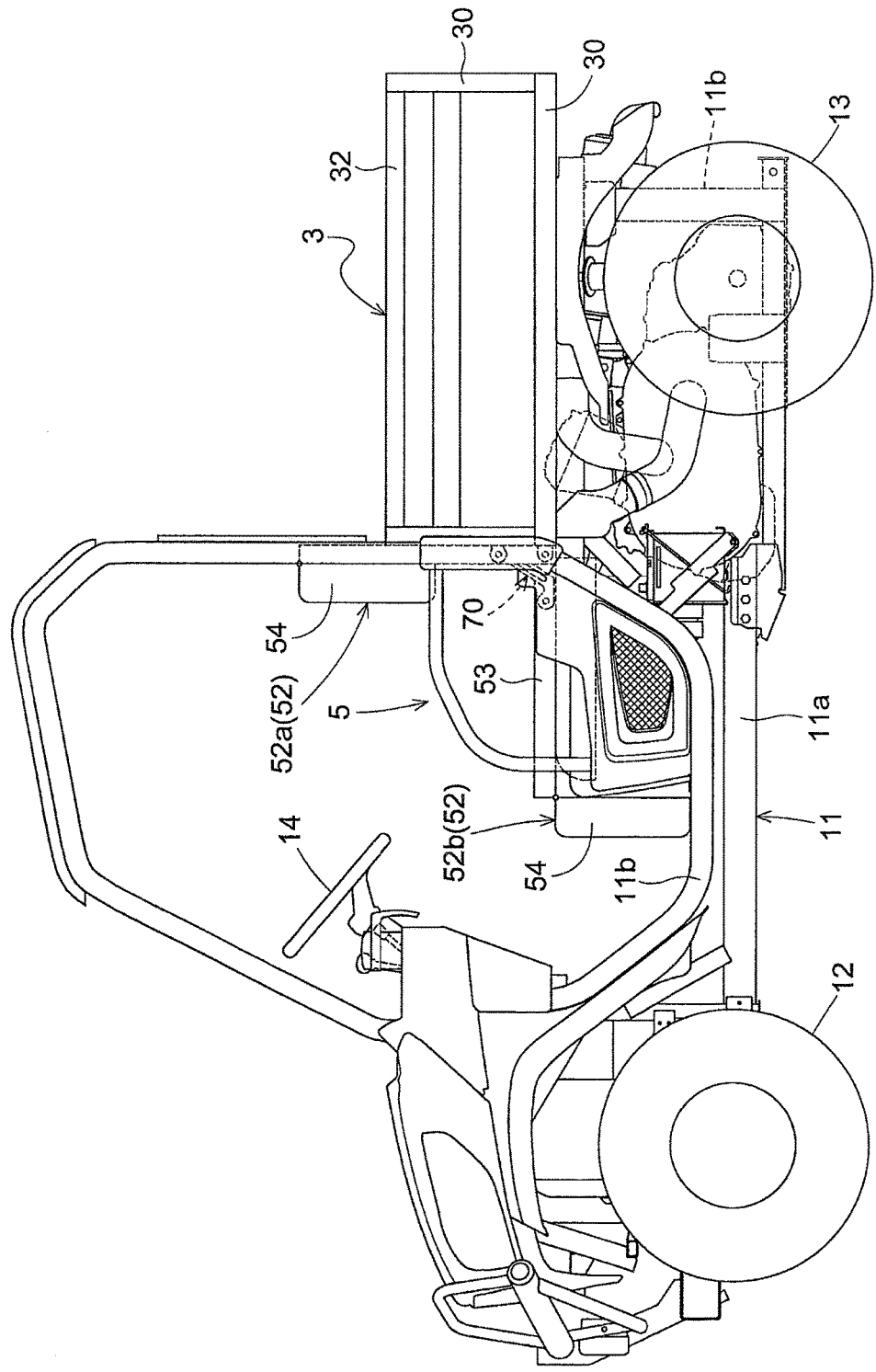
FIG. 2 shows a side view of a utility vehicle in a state in which a cargo space has been expanded by folding a seat device.

FIGS. 1 and 2 are side views of the utility vehicle, FIG. 1 showing a state prior to expansion of the cargo space, and FIG. 2 showing a state after expansion of the cargo space. The utility vehicle is a four-wheel drive vehicle with front wheels 12 and rear wheels 13 that are driving wheels. The front wheels 12 can be steered and the rear wheels 13 cannot be steered.

The vehicle frame 11 has a planar main frame 11a and an upper frame 11b composed of multiple vertical frames provided in a standing manner on the main frame 11a and multiple cross frames. An engine and a transmission (not shown) are mounted on the main frame 11a. A steering wheel 14 and a single-row seat device 5 are attached to the upper frame 1ib.

Figure 3:
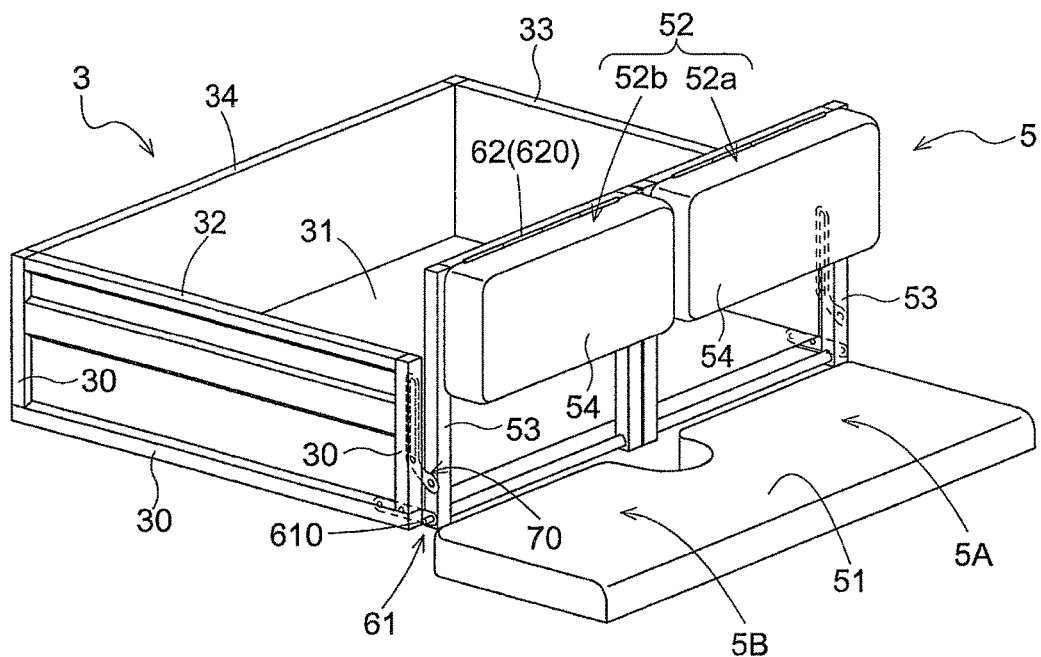
FIG. 3 is a schematic perspective view showing a cargo box prior to expansion.
Figure 4:
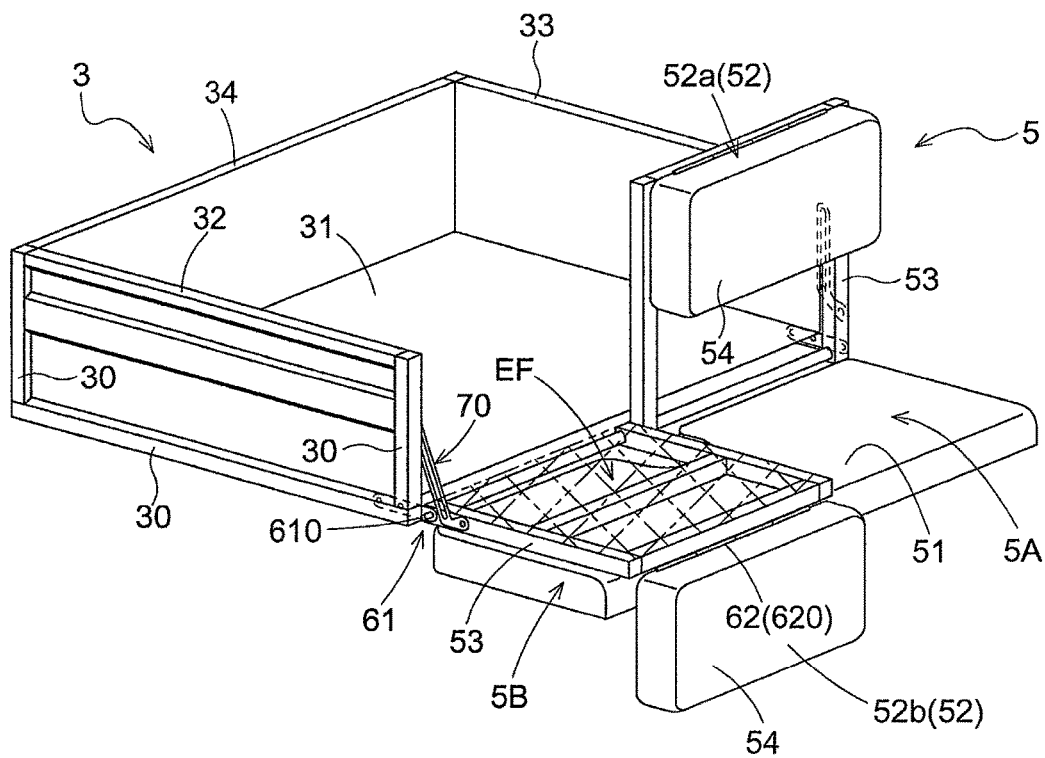
FIG. 4 is a schematic perspective view showing a cargo space expanded by folding a left seat back.

As is evident from FIG. 3, the single-row seat device 5 is composed of a driver seat (or passenger seat) 5A located on the left side and a passenger seat (or driver seat) 5B located on the right side. The seat device 5 is a folding structure.

As shown in FIG. 3, the cargo box 3 includes a cargo frame 30 and a flat cargo floor 31 provided below the cargo frame 30. Furthermore, a left door 32, a right door 33, and a rear door 34 are attached to the cargo frame 30 so as to be able to open and close. The left door 32 functions as a left-side wall of the cargo box 3, the right door 33 functions as a right-side wall of the cargo box 3, and the rear door 34 functions as a rear wall of the cargo box 3. No front wall is provided in the cargo box 3, and the seat device 5 fulfills that role.

Hereinafter, the seat device 5 will be described with reference to FIGS. 3 to 9. The seat device 5 includes a seat bottom 51 and a seat back 52. The seat bottom 51 is attached to the upper frame 11b via a bracket (not shown). In this embodiment, the seat bottom 51 is a one-seat type that extends in the approximate entirety of the vehicle width. In contrast to this, the seat back 52 is composed of a left seat back 52a and a right seat back 52b that are arranged in alignment in the vehicle lateral direction. The left seat back

52a and the right seat back 52b have substantially the same structure, and therefore unless it is necessary to make a particular distinction therebetween, the term "seat back 52" will be used in the description below.

The seat back 52 includes a seat back frame 53 and a seat back main body 54. The lower end of the seat back frame 53 is attached swingably to a first swinging unit 61 that has a first lateral swinging shaft 610. The first lateral swinging shaft 610 extends in the vehicle lateral direction and the first swinging unit 61 is supported by the upper frame 11b of the vehicle frame 11. The seat back main body 54 is swingably attached to the seat back frame 53 via a second swinging unit 62 that has a second swinging shaft 620 provided on the upper end of the seat back frame 53. In this embodiment, the second swinging unit 62 is multiple hinges. One leaf of a hinge is fixed to the upper end of the seat back frame 53, the other leaf is fixed to the upper end of the seat back main body 54, and the second swinging shaft 620 is the swinging shaft of the hinge.

The seat back frame 53 swings about the first lateral swinging shaft 61 from the upright position to a horizontal position of being in an orientation of overlapping with the seat bottom 51 above the seat bottom 51. The seat back frame 53 in the upright position is approximately orthogonal to the cargo floor 31 and functions as at least a portion of the front wall of the cargo box 3 (see FIG. 3). Also, the seat back frame 53 in the horizontal position forms a horizontal surface that is approximately identical to the cargo floor 31 and defines the expansion floor EF by which the floor space defined by the cargo floor 31 is further expanded in the forward direction (see FIG. 4).

Figure 5:
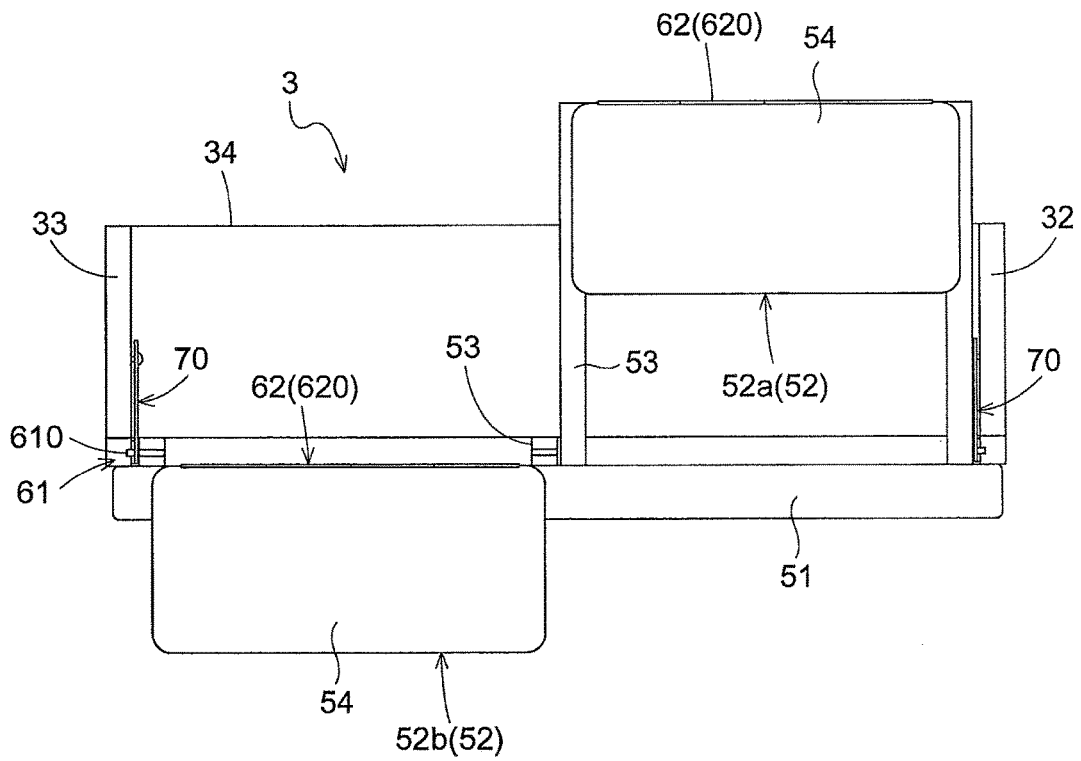
FIG. 5 is a front view of the seat device in a state in which the left seat back is folded.
Figure 6:
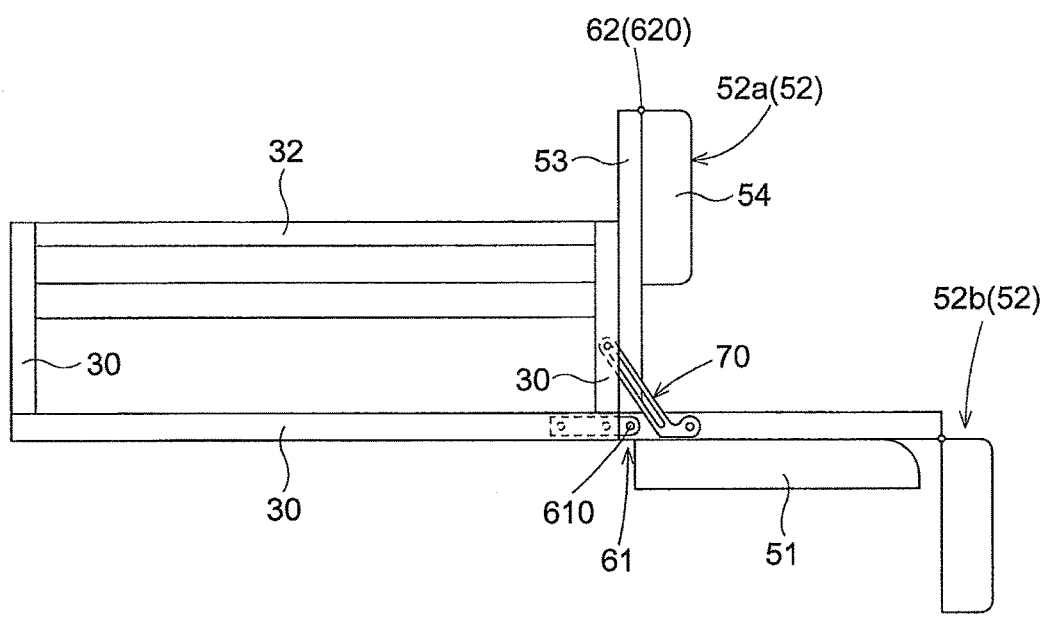
FIG. 6 is a side view of the seat device in a state in which the left seat back is folded.

If the seat back frame 53 is swung to the horizontal position, the second swinging shaft 620 is located immediately in front of the front end of the seat bottom frame 51. As shown in FIGS. 5 and 6, at this time, when the seat back main body 54 swings 90 degrees about the second swinging shaft 620, the seat back main body 54 enters a hanging orientation in which the front of the seat bottom 51 hangs down from the seat back frame 53. In other words, the seat back main body 54 in the hanging orientation is accommodated in the space (foot space) on the front side of the seat device 5.

Figure 7:
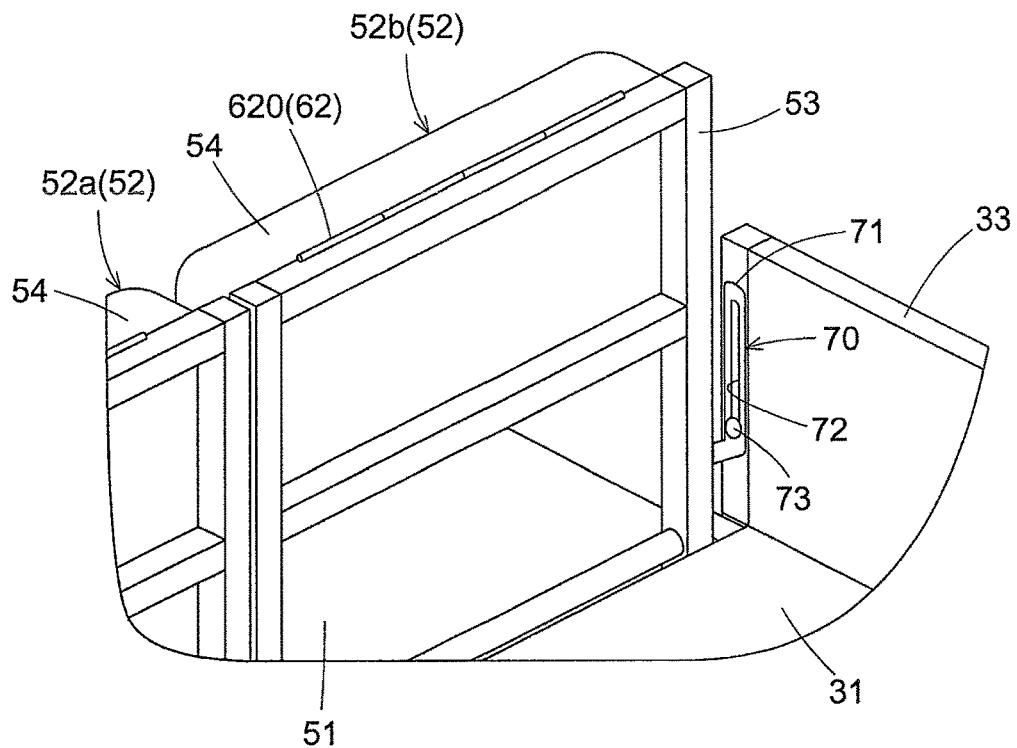
FIG. 7 is a perspective view showing an orientation of a lever stopper mechanism for a right seat back in an upright position.
Figure 8:
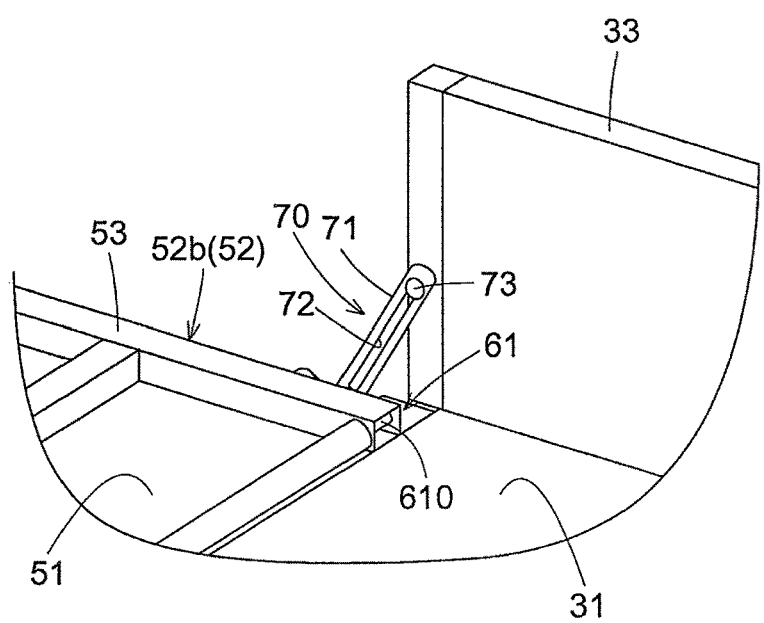
FIG. 8 is a perspective view showing an orientation of the lever stopper mechanism for the right seat back in a horizontal position.
Figure 9:
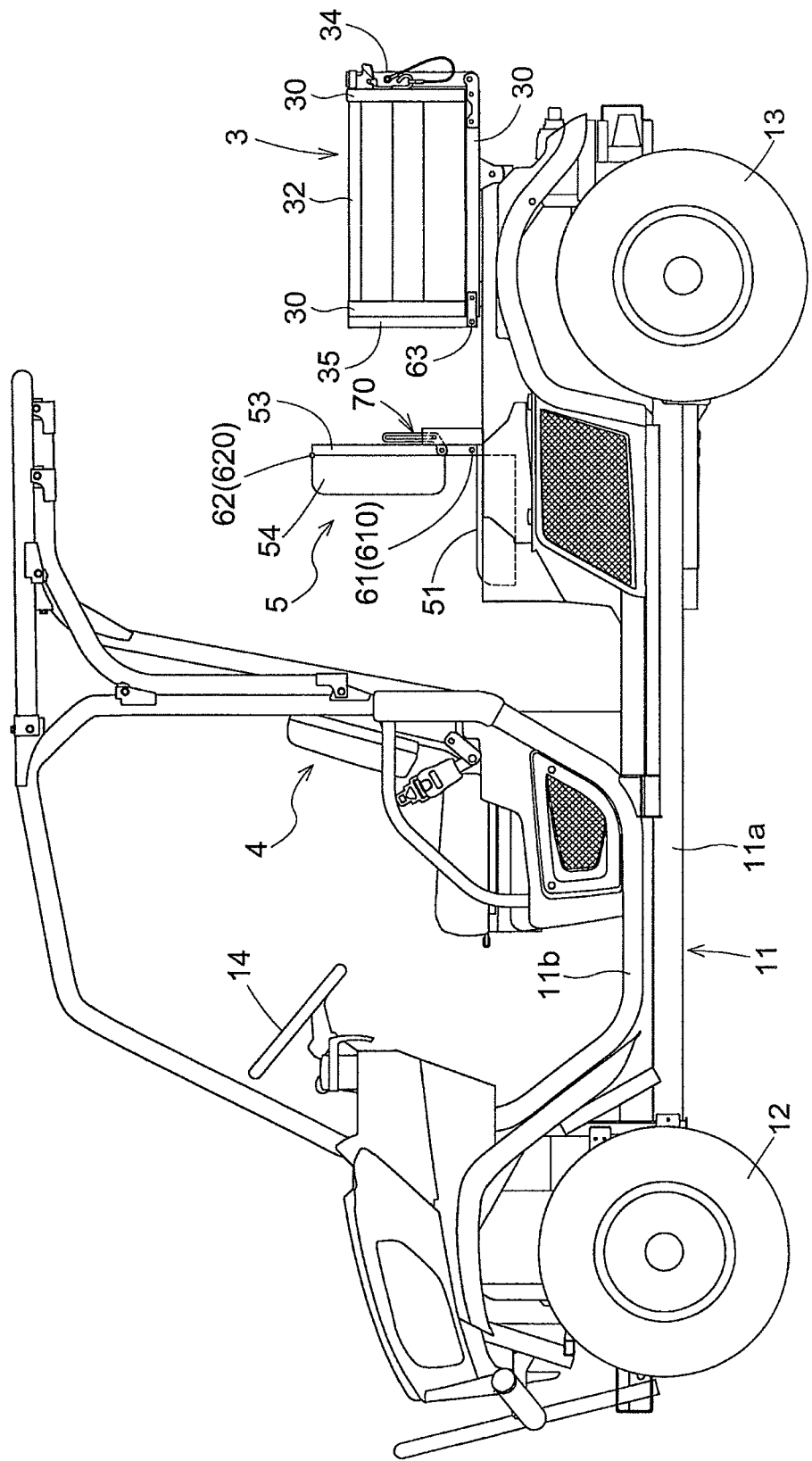
FIG. 9 shows a side view of a utility vehicle according to a second embodiment.
Figure 10:
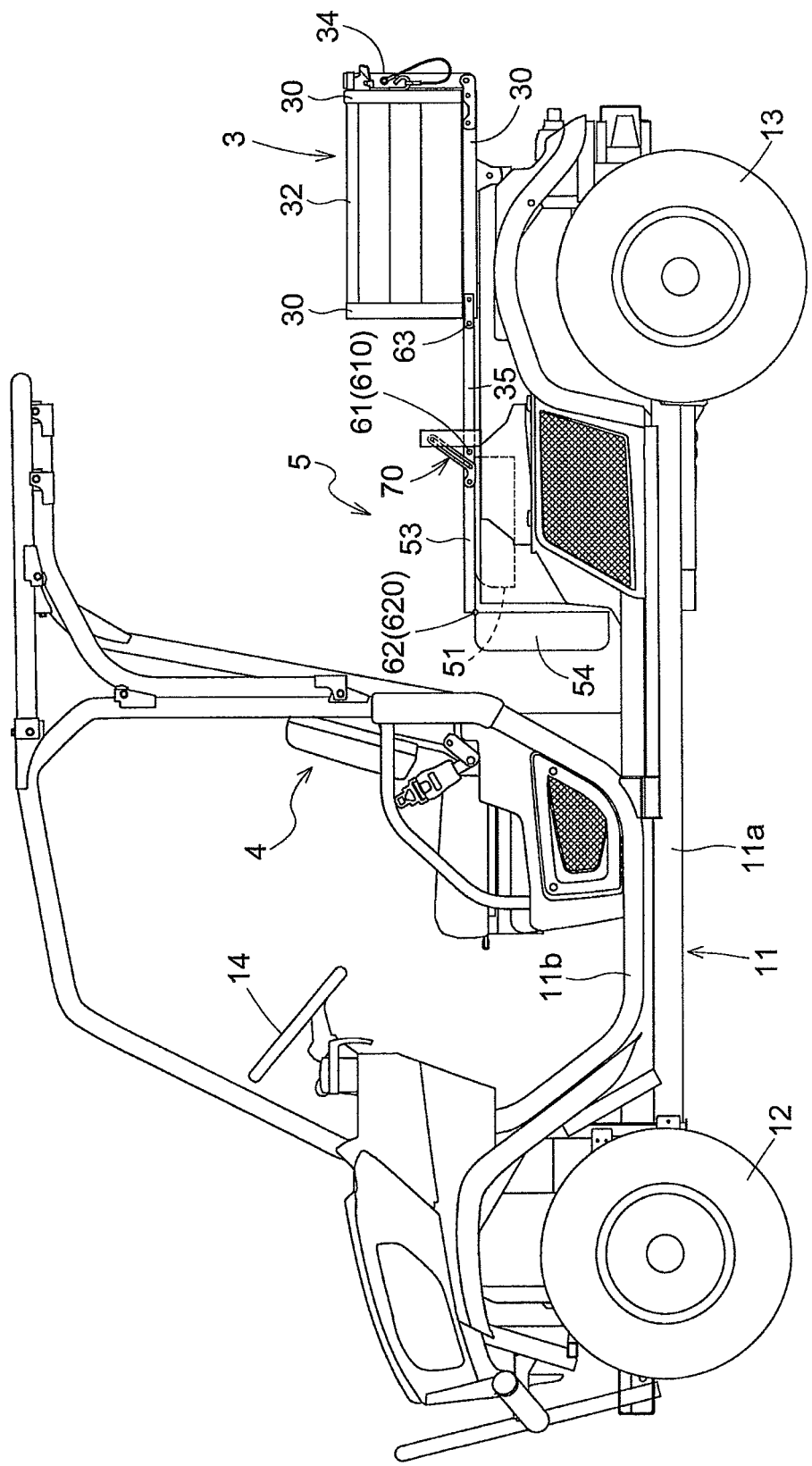
FIG. 10 shows a side view of a utility vehicle in a state in which a cargo space has been expanded by folding a rear seat device.
Figure 11:
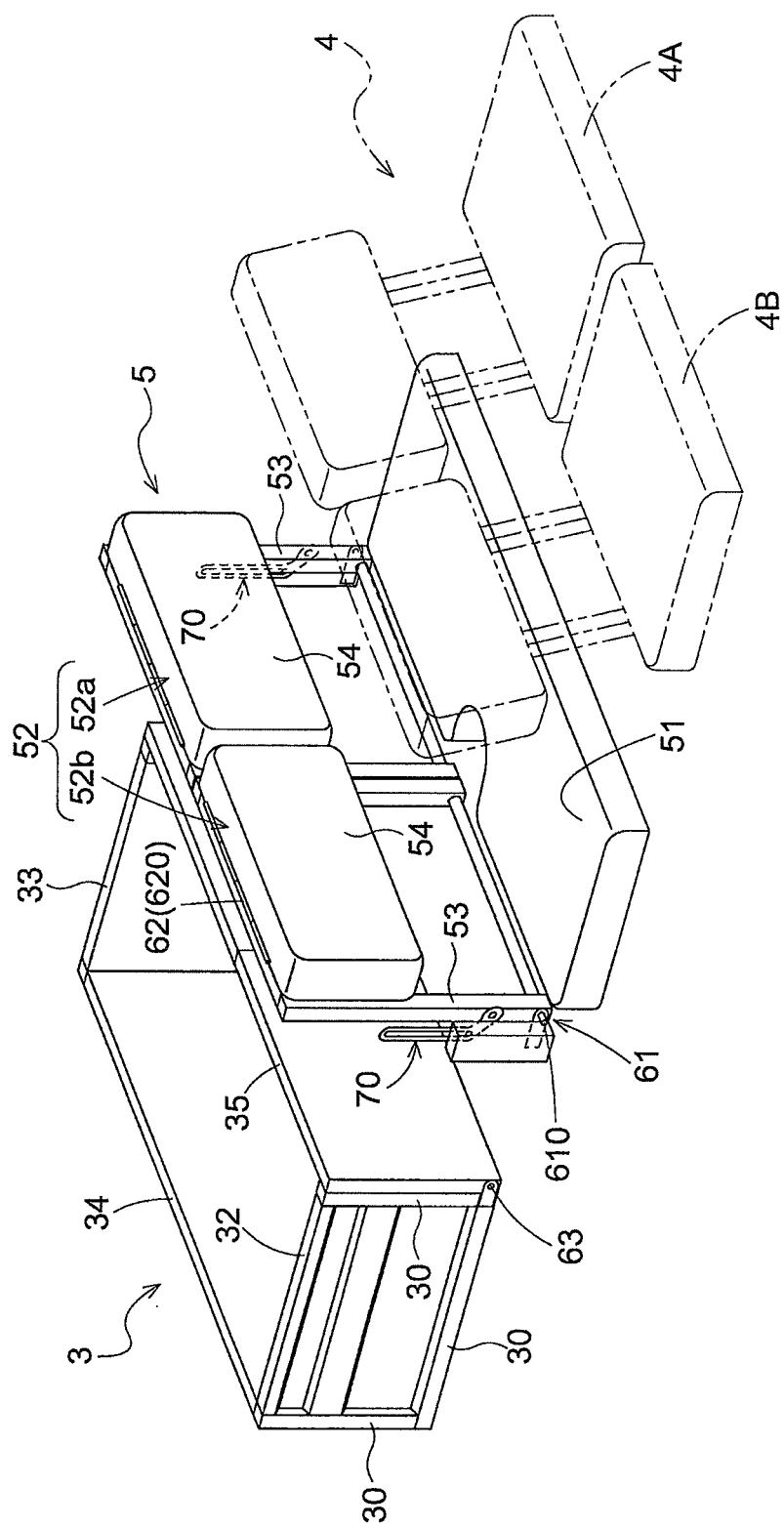
FIG. 11 is a schematic perspective view showing a cargo box and a rear seat device prior to expansion.

If the seat back frame 53 swings past the horizontal position and further downward, the seat back frame 53 will press against the upper surface of the seat bottom 51, damaging the seat bottom 51. In order to prevent this, as shown in FIGS. 7 and 8, a lever stopper mechanism 70 is included. The lever stopper mechanism 70 is composed of a lever 71 in which an elongated hole 72 is formed, and a headed pin 73 that is inserted in the elongated hole 72. The base end of the lever 71 is attached swingably to the seat back frame 53. The headed pin 73 is fixed to a vertical support column, which is a portion of the cargo frame 30.

If the seat back frame 53 is in the upright position (see FIG. 7), the headed pin 73 is located on the support end side of the lever 71. As the seat back frame 53 swings toward the horizontal position, the positional relationship of the elongated hole 72 with respect to the headed pin 73 changes, and if the seat back frame 53 reaches the horizontal position (see FIG. 8), the headed pin 73 locks to the upper end of the elongated hole 72, preventing further swinging below the seat back frame 53.

In this embodiment, left seat back 52a included in the driver seat 5A and the right seat back 52b included in the passenger seat 5B are independent of each other and can fold. Accordingly, if only the left seat back 52a is folded (see FIG. 4), the space of the driver seat 5A can be used as the expansion floor EF. Also, if both the left seat back 52a and the right seat back 52b are folded, the space of the driver seat 5A and the passenger seat 5B can be used as the expansion floor EF, and a wide space that is suitable for resting, sleeping, or the like is created.

Next, a second embodiment will be described with reference to FIGS. 9 to 13. This utility vehicle has a two-row seat structure, and a front seat device 4 and a rear seat device 5 are attached to the upper frame 1ib. In the second embodiment, the expansion floor EF by which the cargo floor 31 is expanded in the forward direction is created by folding the rear seat device 5. In other words, regarding the expansion of the cargo box 3, in the second embodiment, the rear seat device 5 functions as the seat device 5 of the first embodiment.

The front seat device 4 is composed of a driver seat (or passenger seat) 4A located on the left side and a passenger seat (or driver seat) 4B located on the right side. The rear seat device 5 is located between the front seat device 4 and the cargo box 3 and has a folding structure so that the space can be used for many purposes.

Similarly to the first embodiment, the cargo box 3 includes a cargo frame 30 and a flat cargo floor 31 that is arranged on the lower portion structure of the cargo frame 30. However, as is evident from FIGS. 11 and 12, in addition to the left door 32, the right door 33, and the rear door 34, a left and right pair of front doors 35 that can open and close are attached to the cargo frame 30. The front doors 35 can swing about a door rotation shaft 63 provided on the lower ends, between the upright orientation and the horizontal orientation.

The rear seat device 5 of the second embodiment is substantially the same as the seat device 5 of the first embodiment, and therefore the description of the structure thereof is omitted.

Figure 12:
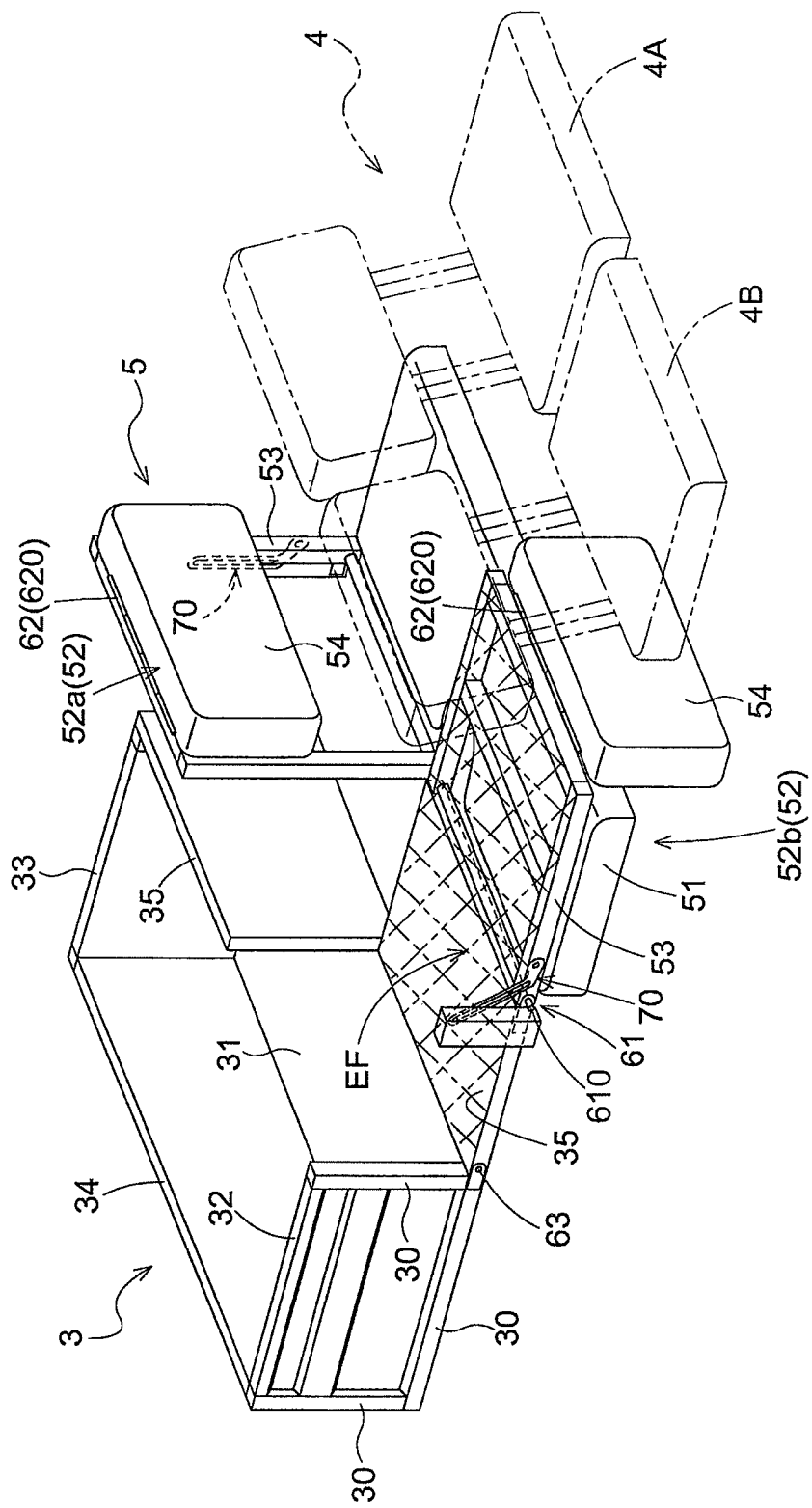
FIG. 12 is a schematic perspective view showing a cargo space that has been expanded by folding a front door on the left side of the cargo box and folding the left seat back of the rear seat device.
Figure 13:
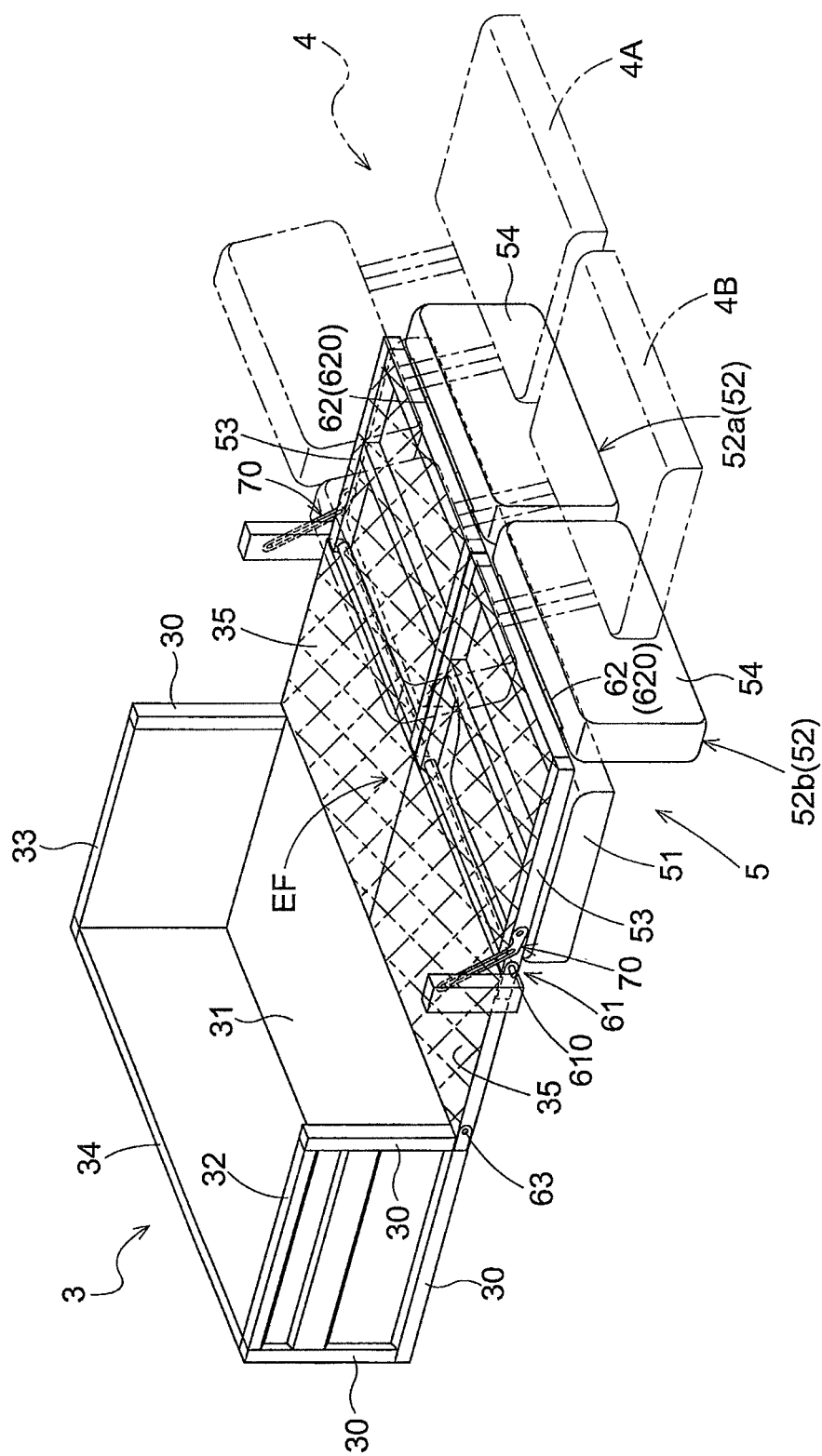
FIG. 13 is a schematic perspective view showing a cargo space that has been expanded by folding the front doors on the left and right of the cargo box and folding the seat backs on the left and right of the rear seat device.

In the second embodiment, as shown in FIGS. 12 and 13, the expansion floor EF is created by rotating the front doors 35 of the cargo box 3 to the horizontal orientation and folding the rear seat device 5. The upper surfaces of the front doors 35 in the horizontal orientation, the upper surface of the seat back frame 53 of the rear seat device 5 in the horizontal position, and the cargo floor 31 substantially form one flat surface, and the flat surface is used as the expansion floor EF. Here as well, the seat back 52 of the rear seat device 5 is arranged in alignment in the vehicle width direction, and the seat back 52 is composed of a left seat back 52a and a right seat back 52b that can fold independently. For this reason, if the front door 35 on the right side and the right seat back 52b are folded, the horizontal surface on the vehicle body right side that is created by the front door 35 on the right side and the right seat back 52b can be used as the expansion floor EF. Also, if the front door 35 on the left side and the left seat back 52a are folded (see FIG. 12), the horizontal surface on the vehicle body left side that is created by the front door 35 on the left side and the left seat back 52a can be used as the expansion floor EF. Of course, if the front doors 35 on both sides and the left and right seat backs 52a and 52b are folded (see FIG. 13), the horizontal surface in the entire width of the vehicle body that is created by the front doors 35 on both sides and the left and right seat backs 52a and 52b can be used as the expansion floor EF.

In the above-described first embodiment and second embodiment, the left and right seat backs 52a and 52b that can be folded had approximately the same width, but they may have different widths. In this case, in the second embodiment, the width ratio of the left and right seat backs 52a and 52b and the width ratio of the left and right front doors 35 are the same.

Figure 14:
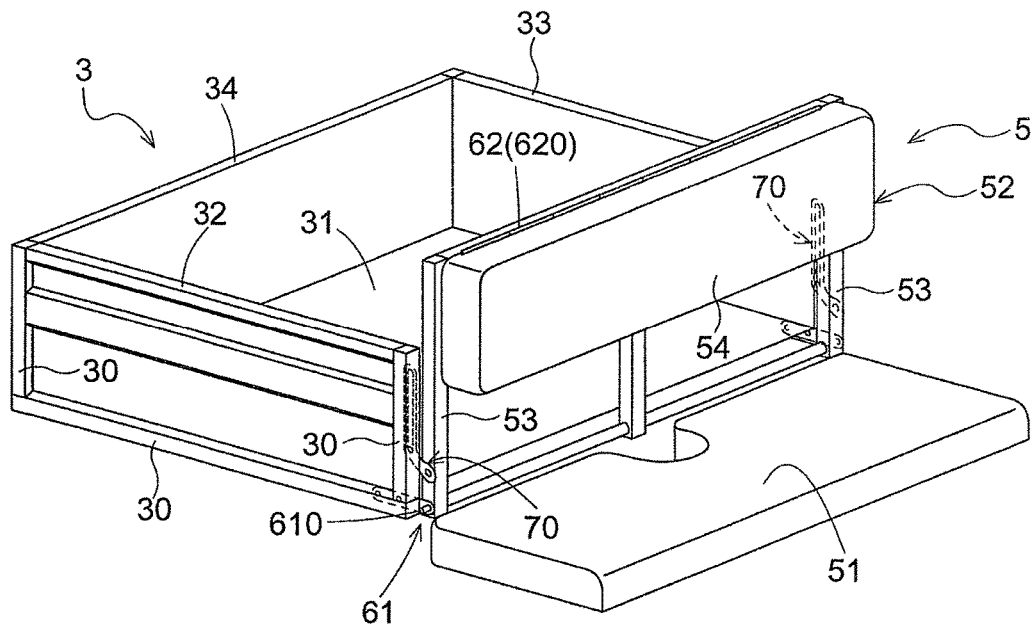
FIG. 14 is a perspective view showing a one-seat type of seat device and a cargo box.
Figure 15:
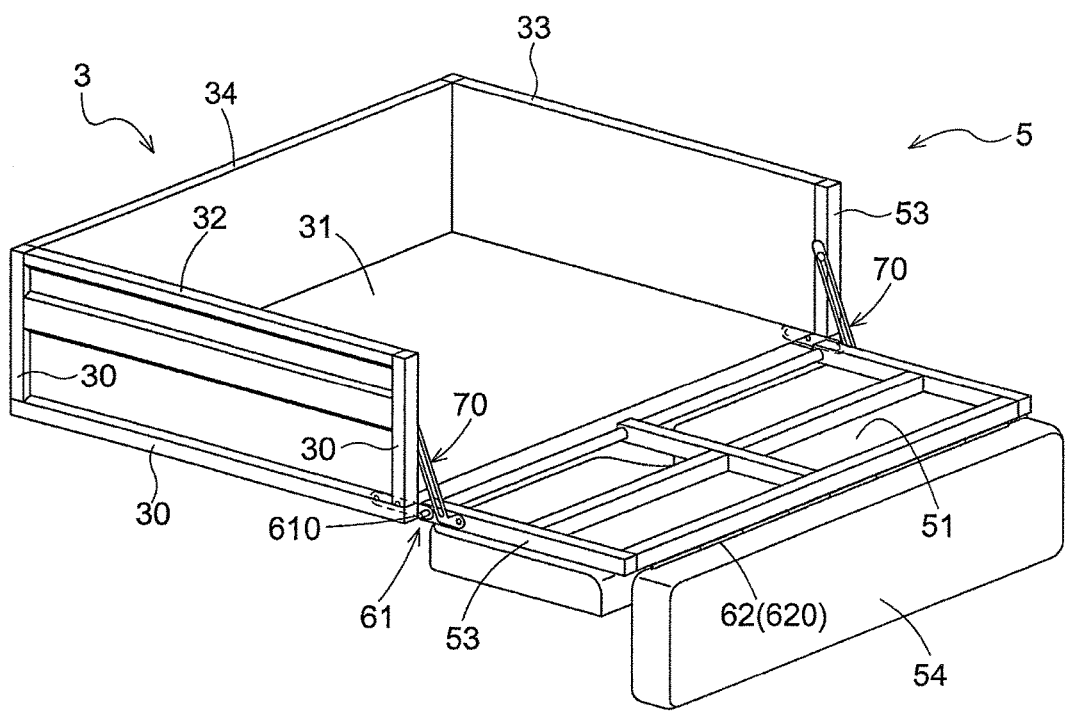
FIG. 15 is a perspective view showing expansion of a cargo space by folding a one-seat type of seat device.

The seat back 52 that can be folded may be divided into three or more parts. Conversely, as shown in FIGS. 14 and 15, the seat back 52 may be a one-seat type that is not divided. With this kind of one-seat type of seat device 5, the space of the cargo box 3 is expanded in the entire width by an amount corresponding to the height of the seat back 52 by swinging the seat back 52 to the horizontal position.

Next, a modified version of the second embodiment will be described with reference to FIGS. 16 and 17. The rear seat device 5 includes a seat bottom 51 of one-seat type and a seat frame 53 and a seat back 52 of a two-seat type. The seat frame 53 includes a left seat frame 53a and a right seat frame 53b which are individually foldable. A left seat back 52a is fixed to the left seat frame 53a and a right seat back 52b is fixed to the right seat frame 53b. In other words, the left seat frame 53a and the left seat back 52a are swingable in a unified matter in the forward direction about the first lateral swinging shaft 610, and the same holds for the right seat frame 53b and the right seat back 52b. At the end of the swinging, each of the left seat back 52a and the right seat back 52b overlaps with the corresponding part of the upper surface of the seat bottom 51 (see FIG. 17). The front door 35 of the cargo box 3 is swung in the rear direction about the door rotation shaft 63 and overlaps with the upper face of the cargo floor 31 (see FIG. 17).

In this modified version, the expansion floor EF is formed by swinging the front door 35 of the cargo box 3 to the horizontal position and swinging the seat back 52 to the horizontal position. The expansion floor EF extending in the half of the entire width of the vehicle is formed by swinging one of the left seat back 52a and the right seat back 52b to the horizontal position, and the expansion floor EF extending in the entire width of the vehicle is formed by swinging both of the left seat back 52a and the right seat back 52b to the horizontal position.

In the modified version shown in FIGS. 16 and 17, the widths are the same between the left seat frame 53a (left seat back 52a) and the right seat frame 53b (right seat back 52b), but the width ratio therebetween may be altered. In addition, the seat frame 53 (seat back 52) may be divided into three or more.

In the above-mentioned embodiment, both the left seat frame 53a (left seat back 52a) and the right seat frame 53b (right seat back 52b) are foldable, but one of them may be foldable and the other may be fixed. In that case, the seat frame on a driver seat-side is fixed. In other words, in the case of a vehicle with the steering wheel on the left side, the left seat frame 53a is fixed, and in the case of a vehicle with the steering wheel on the right side, the right seat frame 53b is fixed.

The configurations disclosed in the above-described embodiments (including the other embodiments; the same will also apply below) may be applied while being combined with configurations disclosed in other embodiments, provided there is no inconsistency. Regarding other configurations as well, the embodiments disclosed in this specification are examples in all aspects, and may be modified as appropriate without departing from the object of the invention.

The invention claimed is:

1. A utility vehicle including a convertible cargo, comprising:
   a vehicle frame;
   a cargo box supported by the vehicle frame on a vehicle rearward side; and
   a single-row seat device supported by the vehicle frame forward of the cargo box,
   including
      a seat bottom supported by the vehicle frame, and
      a seat back that includes a first lateral swinging shaft that extends in a vehicle lateral direction and is supported by the vehicle frame, a seat back frame that swings about the first lateral swinging shaft between an upright position and a horizontal position at which the seat back frame overlaps with the seat bottom, and a seat back main body attached to the seat back frame so as to be able to swing about a second lateral swinging shaft that is parallel to the first lateral swinging shaft,
   the seat back frame in the upright position functions as a front wall of the cargo box and the seat back frame in the horizontal position defines an expansion floor by which a floor of the cargo box is expanded in a forward direction, and
   the seat back main body swings to a hanging orientation with respect to the seat back frame in the horizontal position and is located in front of the seat bottom.

2. The utility vehicle according to claim 1, wherein the first lateral swinging shaft is arranged between a lower end of the seat back frame and the vehicle frame at a position at which an upper surface of the seat back frame in the horizontal position matches a floor surface of a cargo box.

3. The utility vehicle according to claim 1, wherein the second lateral swinging shaft is arranged between an upper end of the seat back frame and an upper end of the seat back main body.

4. The utility vehicle according to claim 3, wherein the seat back main body in the hanging orientation hangs at a right angle with respect to the seat back frame in the horizontal position, and in this case, the upper end of the seat back main body is located below the upper surface of the seat back frame.

5. The utility vehicle according to claim 1, wherein a lever stopper mechanism for preventing further downward swinging from the horizontal position of the seat back frame is provided.

6. The utility vehicle according to claim 1, wherein the seat device is composed of a left seat unit and a right seat unit that are aligned in a vehicle lateral direction, and each seat unit includes the seat bottom, the seat back, and the first lateral swinging shaft.

7. The utility vehicle according to claim 6, wherein the first lateral swinging shaft of the left seat unit and the first lateral swinging shaft of the right seat unit are composed of one common swinging shaft.

* * * * *